(12) United States Patent
Walker (10) Patent No.: US 8,776,049 B2
(45) Date of Patent: Jul. 8, 2014

(54) ADDRESS ALIGNED RESOURCE SET ALLOCATION IN A MEMORY SPACE

(75) Inventor: Michael Dean Walker, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 2570 days.

(21) Appl. No.: 10/969,150

(22) Filed: Oct. 20, 2004

(65) Prior Publication Data

US 2006/0085620 A1    Apr. 20, 2006

(51) Int. Cl.
*G06F 9/455*    (2006.01)
*G06F 9/26*    (2006.01)

(52) U.S. Cl.
USPC .............................................. 718/1; 711/200

(58) Field of Classification Search
USPC .............................................. 718/1; 711/200
See application file for complete search history.

(56) References Cited

U.S. PATENT DOCUMENTS

| | | | |
|---|---|---|---|
| 3,921,144 A | 11/1975 | Woodrum | |
| 4,910,507 A | 3/1990 | Shimizu et al. | |
| 5,297,258 A | 3/1994 | Hale et al. | |
| 5,410,722 A | 4/1995 | Cornaby | |
| 5,448,566 A | 9/1995 | Richter et al. | |
| 5,574,851 A | 11/1996 | Rathunde | |
| 5,638,514 A | 6/1997 | Yoshida et al. | |
| 5,712,979 A | 1/1998 | Graber et al. | |
| 5,724,539 A | 3/1998 | Riggle et al. | |
| 5,737,542 A | 4/1998 | Kurihara et al. | |
| 5,765,203 A | 6/1998 | Sangha | |
| 5,778,197 A * | 7/1998 | Dunham | 710/104 |
| 5,790,427 A | 8/1998 | Greer et al. | |
| 5,875,147 A | 2/1999 | Park | |
| 5,949,976 A | 9/1999 | Chappelle | |
| 6,041,423 A | 3/2000 | Tsukerman | |
| 6,115,788 A | 9/2000 | Thowe | |
| 6,125,435 A | 9/2000 | Estakhri et al. | |
| 6,427,195 B1 * | 7/2002 | McGowen et al. | 711/153 |
| 6,457,115 B1 | 9/2002 | McGrath | |
| 6,499,097 B2 | 12/2002 | Tremblay et al. | |
| 6,507,901 B1 * | 1/2003 | Gopalakrishnan et al. | 711/170 |
| 6,567,910 B2 | 5/2003 | Tessarolo et al. | |
| 6,581,135 B2 | 6/2003 | Nakano et al. | |
| 6,594,708 B1 | 7/2003 | Slaughter et al. | |
| 6,697,868 B2 | 2/2004 | Craft et al. | |
| 6,714,979 B1 | 3/2004 | Brandt et al. | |

(Continued)

FOREIGN PATENT DOCUMENTS

JP    2002-092638 A2    3/2002

*Primary Examiner* — Mengyao Zhe
(74) *Attorney, Agent, or Firm* — Hall Estill Attorneys at Law (57) ABSTRACT

Method and apparatus for aligning addresses of resource sets in a memory space used by a software system. The resource sets are accessed by multiple layers of a software system and are each provided with a respective alignment requirement preferably comprising a power of two. A table preferably includes entries for each of the resource sets, and the table is sorted to provide a decreasing sequence beginning with the resource set having the greatest alignment requirement and ending with the resource set having the smallest alignment requirement. The resource sets are thereafter placed in the memory space in accordance with the decreasing sequence at localized addresses that align with the respective alignment requirements of the resource sets. Each resource within each resource set uses a localized, base address. The actual address within the memory space is preferably stored at a specified offset within a global structure.

18 Claims, 5 Drawing Sheets

(56) References Cited

U.S. PATENT DOCUMENTS

| | | |
|---|---|---|
| 6,757,802 B2 | 6/2004 | Trainin et al. |
| 6,836,836 B2 | 12/2004 | Shinozaki |
| 6,895,491 B2 | 5/2005 | Kjos et al. |
| 7,219,214 B2 * | 5/2007 | Ford et al. ............ 712/225 |
| 7,307,948 B2 * | 12/2007 | Infante et al. .......... 370/225 |
| 2004/0064639 A1 | 4/2004 | Sicola et al. |

* cited by examiner

ADDRESS ALIGNED RESOURCE SET ALLOCATION IN A MEMORY SPACE

FIELD OF THE INVENTION

The claimed invention relates generally to the field of computer software and more particularly, but not by way of limitation, to an apparatus and method for efficiently allocating addresses in a memory space for resource sets used by multiple layers of software.

BACKGROUND

Computer-based systems enable a wide variety of data processing tasks to be accomplished in a fast and efficient manner. From hand-held consumer products to geographically distributed wide area networks with multi-device data storage arrays, such systems continue to increasingly pervade all areas of society and commerce.

Software is provided to direct the operation of such systems. Software (including firmware) can take a number of forms such as application programs, operating systems, interface and controller routines, and maintenance and housekeeping modules. Each time a process is initiated by the software, a number of additional processes, handshakes, links, calculations, and other events can be carried out by the various layers of software in order to service and complete the initial process. Resource sets utilized by the various processes can be allocated to a memory space during system initialization to provide ready access by the various layers during operation.

Generally, with increased complexity in the overall software system, including additional layers of software applications and operating systems, distributed processing and fault tolerant redundancy, it can become increasingly difficult to allocate multiple resource sets of various size from the various layers into the same memory space in an efficient manner.

SUMMARY OF THE INVENTION

Accordingly, preferred embodiments of the present invention are generally directed to a method and an apparatus for aligning addresses of resource sets in a memory space used by a software system, such as in a distributed computer-based system that utilizes a data storage array.

In accordance with some preferred embodiments, the method preferably comprises providing a plurality of resource sets configured for use by a plurality of software layers in a software system with each resource set having an associated alignment requirement. The method further preferably comprises aligning the resource sets with base addresses in a memory space, each base address comprising a multiple of the alignment requirement of the associated resource set. Preferably, the largest alignment requirement resource set is allocated first, followed by the next largest resource set, and so on.

The method further preferably comprises employing a table with a plurality of entries each corresponding to a selected one of the plurality of resource sets, and sorting the table entries to provide a decreasing sequence beginning with the resource set having the greatest alignment requirement and ending with the resource set having the smallest alignment requirement.

Preferably, each of the associated size of the resource sets comprises a multiple of the alignment requirement. When a selected resource set has an associated initial size that is not a multiple of the alignment requirement, the method further preferably comprises a step of appending bits to the selected resource set to provide a final size equal to a multiple of the alignment requirement.

In accordance with further preferred embodiments, the apparatus preferably comprises a software system resident in a first memory space and comprising multiple layers each configured to access at least one respective resource set having an associated alignment requirement. The software system further comprises an address alignment module which sequentially aligns the resource sets with base addresses in a second memory space, each base address comprising a multiple of the alignment requirement of the associated resource set.

The module preferably comprises a table with a plurality of entries each corresponding to a selected one of the resource sets. A control block preferably sorts the entries in the table to provide a decreasing sequence beginning with the resource set having the greatest alignment requirement and ending with the resource set having the smallest alignment requirement, with the control block aligning the address ranges of the second memory space in relation to the decreasing sequence.

An index preferably stores an offset value which, when combined with a base address for a selected resource, provides an actual address for said resource within the second memory space. As before, the respective alignment requirements of the resource sets are preferably equal to a power of two.

These and various other features and advantages which characterize the claimed invention will become apparent upon reading the following detailed description and upon reviewing the associated drawings.

DETAILED DESCRIPTION

Figure 1:
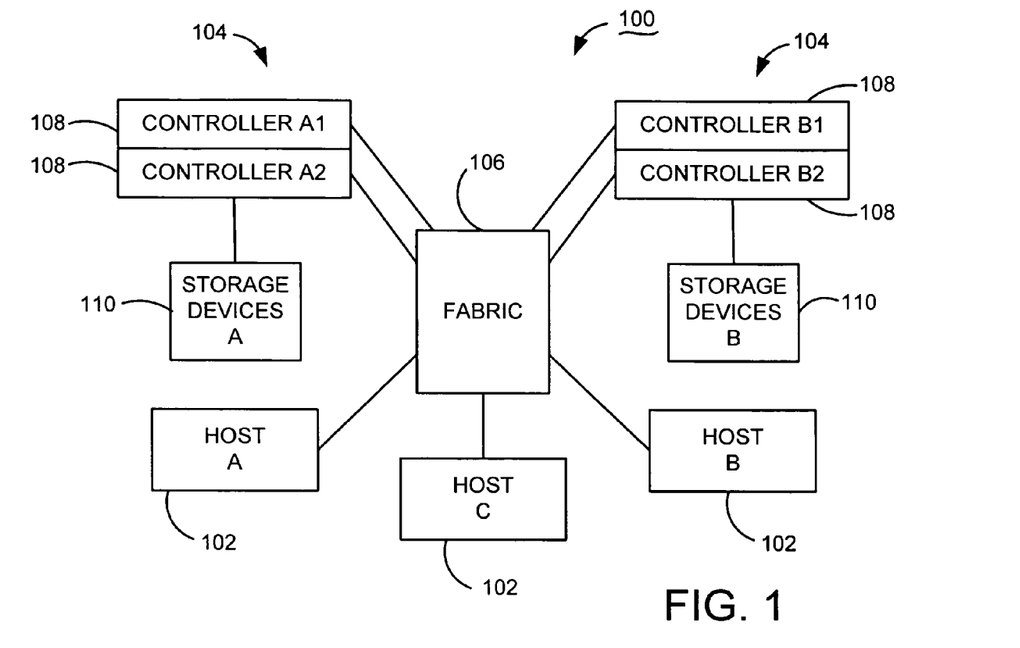
FIG. 1 is a top level functional block depiction of a computer-based system characterized as a wide-area network utilizing mass storage.

To illustrate an exemplary environment in which presently preferred embodiments of the present invention can be advantageously practiced, FIG. 1 shows a computer-based system 100 characterized as a wide area network (WAN) utilizing mass storage.

The system 100 includes a number of host computers 102, respectively identified as hosts A, B and C. The host computers 102 interact with each other as well as with a pair of data storage arrays 104 (denoted A and B, respectively) via a fabric 106. The fabric 106 is preferably characterized as a fibre-channel based switching network, although other configurations can be utilized as well including the Internet.

Each array 104 includes a pair of controllers 108 (denoted A1/A2 and B1, B2 respectively) and a set of data storage devices 110 preferably characterized as hard disc drives operated as a RAID (redundant array of independent discs). The controllers 108 and devices 110 preferably utilize a fault tolerant arrangement so that the various controllers 108 utilize parallel, redundant links and at least some of the user data stored by the system 100 is mirrored on both sets of devices 110.

It is further contemplated that the A host computer 102 and the A data storage array 104 are physically located at a first site, the B host computer 102 and B storage array 104 are physically located at a second site, and the C host computer 102 is at yet a third site, although such is merely illustrative and not limiting.

Figure 2:
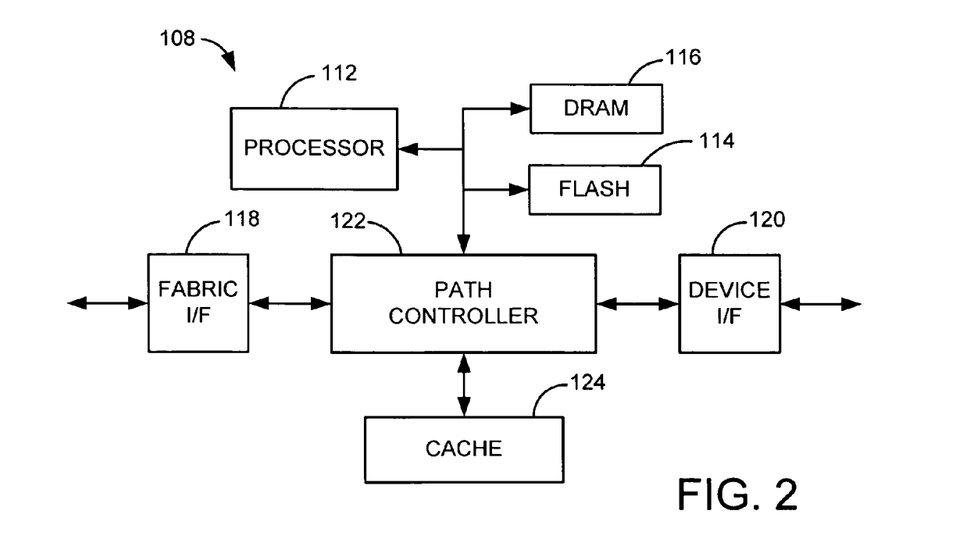
FIG. 2 provides a functional block diagram to illustrate a selected one of the controllers of FIG. 1.

FIG. 2 illustrates a selected one of the controllers 108 in greater detail. The controller 108 can be embodied in a single integrated circuit, or distributed among a number of discrete circuits as desired.

A main processor 112, preferably characterized as a programmable, general purpose computer processor, provides top level control in accordance with programming steps and processing data stored in non-volatile memory 114 (such as flash memory or similar) and in dynamic random access memory (DRAM) 116.

A fabric interface (I/F) circuit 118 communicates with the other controllers 108 and the host computers 102 via the fabric 106, and a device I/F circuit 120 communicates with the storage devices 110. The I/F circuits 118, 120 and a path controller 122 form a communication path to pass commands and data between the storage array and the host using cache memory 124.

Figure 3:
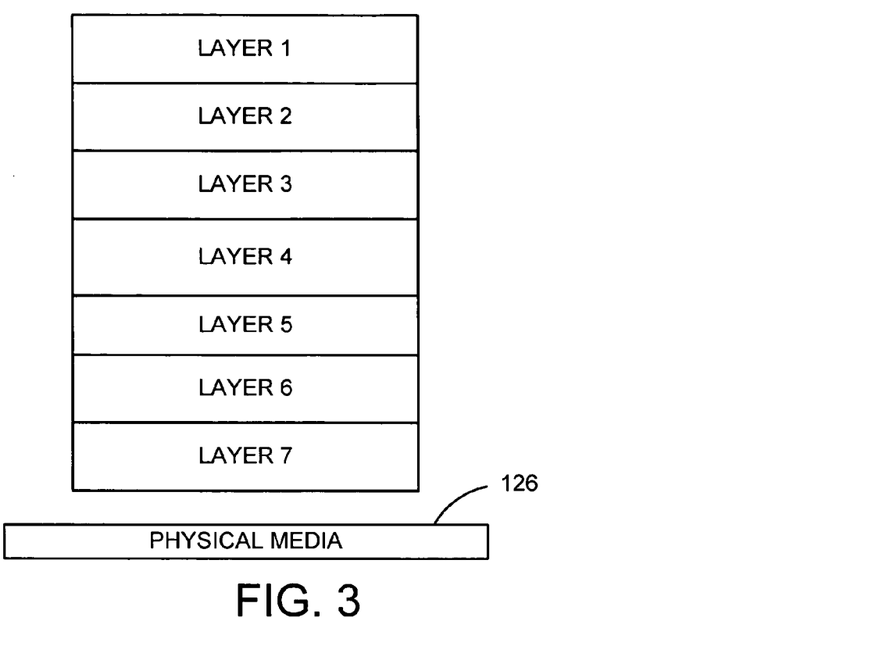
FIG. 3 diagrammatically illustrates a number of different software layers utilized by the system of FIG. 1.

FIG. 3 provides a generalized depiction of a preferred arrangement for software utilized by the system 100 of FIG. 1. In FIG. 3, the software is viewed as being arranged in a number of hierarchical layers (in this case Layer 1 through Layer 7), with Layer 1 representing a top-most layer in farthest proximity to physical media 126 of the devices 110, and Layer 7 representing a bottom-most layer most closely associated with the media 126. Other suitable arrangements can be used as desired, including different numbers and types of layers. For purposes of the present discussion, it is contemplated that Layers 1-3 generally represent application routines and operating systems utilized by the host computers 102, Layers 4-5 represent routines and modules at the controller 108 level, and layers 6-7 represent routines and modules at the device 110 level.

As will be recognized, a data transfer request from a selected host computer 102 to write data to the devices 110 will invoke one or more host level command processes. Such processes in turn invoke various other processes down and back up through the various layers to ultimately result in the completion of the desired task. Along the way, various system resources are allocated, utilized and released.

Figure 4:
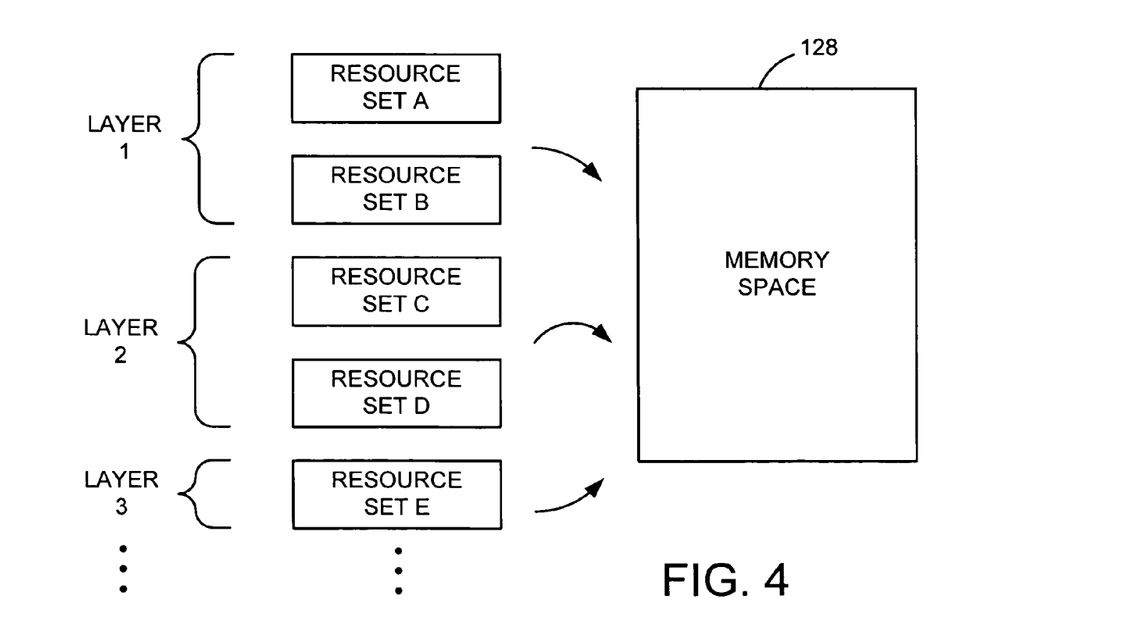
FIG. 4 diagrammatically depicts the need for the multiple layers of FIG. 3 to allocate memory in a memory space for each of a number of different resource sets.

FIG. 4 generally illustrates the need, upon initialization, of the various software layers to allocate memory (such as a program area of the cache 124, FIG. 2) for the storage of resource sets (such as sets A-E represented in FIG. 4). Each resource set is broadly defined as a set of values such as system resources, programming steps, variables, routines, identifiers or other system configuration information stored at a selected address range for subsequent use by one or more processes during system operation. The particular content of a given resource set can accordingly vary widely depending upon the requirements of a given application.

As will be recognized, it is desirable that the respective addresses of the sets be aligned with the addresses of the associated memory space (denoted generally at 128) to facilitate ready location and access by the various software processes. However, having each layer perform its own allocation and address alignment results in a less than optimum utilization of the memory space 128, particularly when existing resource sets are modified or new resource sets are introduced as a result of system software upgrades or enhancements.

Figure 5:
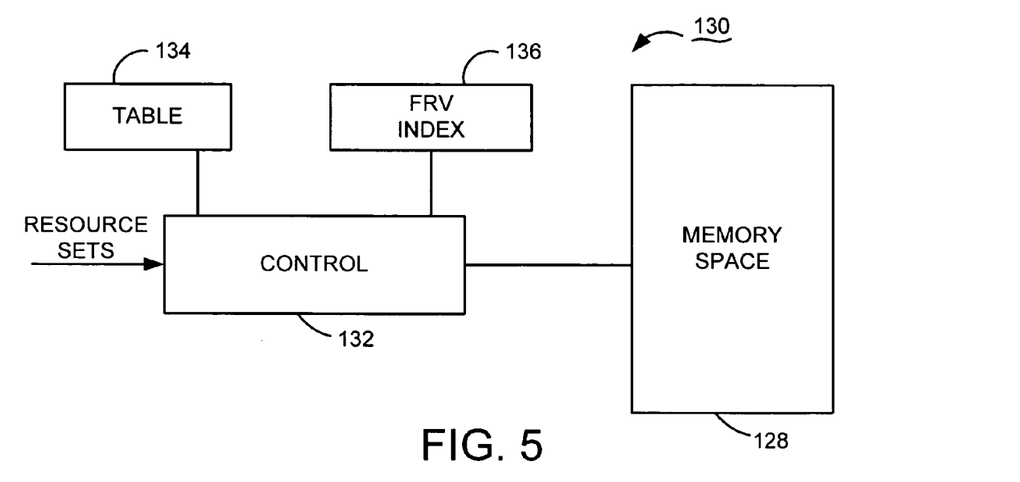
FIG. 5 provides a functional block diagram for a software module utilized to carry out the address allocations required by FIG. 4 in accordance with preferred embodiments of the present invention.

Accordingly, FIG. 5 provides a functional block representation of an address allocation module 130, constructed and operated in accordance with preferred embodiments of the present invention. The module 130 preferably forms a portion of the system software and is resident within the controllers 108, although other configurations can be utilized as well.

As explained below, the module 130 preferably operates upon system initialization to sort the resource sets from all of the applicable layers by alignment requirement, and then allocate memory in the memory space beginning with the largest resource alignment requirement to attain efficient address alignments and memory utilization. As embodied in FIG. 5, the module 130 preferably comprises a control block 132, a resource table 134 and a frequently referenced values (FRV) offset 136. This FRV offset is used to store the base address of the allocated resource set. It is an offset into a global structure that stores all base addresses of all resource sets. The software layer that requested the resource set can then easily access it by using this global structure. The term "alignment requirement" will be understood by those skilled in the art to describe the number of lower order bits that are zero in an address block used to efficiently store the resource set. For example, a resource set with a 32 byte alignment would require at a minimum 5 ($2^5$=32) lower order zeroes at a given base address (e.g., 1110 0000), etc.

Figure 6:
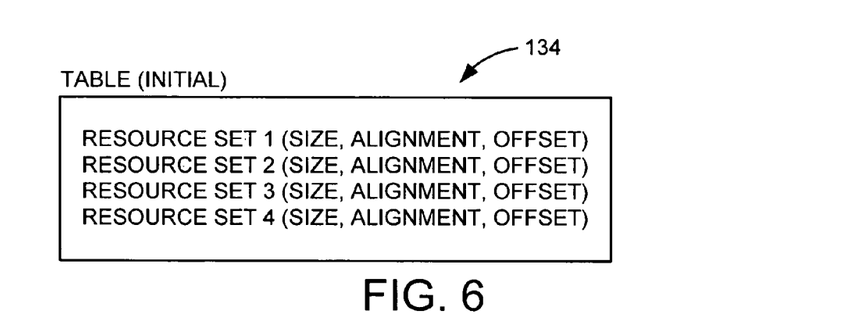
FIG. 6 generally illustrates the table of FIG. 5 with entries provided in an initial order.

A preferred initial format and ordering for the table 134 is represented in FIG. 6. Each entry in the table corresponds to each of the resource sets to be loaded into the memory space 128. For simplicity of illustration, it will be contemplated that there are four (4) such sets, identified as sets 1-4, although any number of different sets can be included within the table. Size, alignment and offset values are preferably included with each entry, as shown.

The entries in table 134 are contemplated as corresponding to resource sets from at least two different layers, and are preferably from all of the layers that access the memory space 128. The alignment requirement of each set preferably comprises the total amount of memory space (in bits) required to accommodate that set. The following simplified exemplary sets are provided to aid in the present discussion, but are by no means limiting.

It is contemplated that the first resource set utilizes a 8000 hex byte alignment requirement (or the low order 15 bits are zero), the second resource set utilizes a 2000 hex byte alignment requirement (or the low order 13 bits are zero), the third resource set utilizes a 10000 hex byte alignment requirement (or the low order 16 bits are zero), and the fourth resource set utilizes a 200 hex byte alignment requirement (or the low order 9 bits are zero).

For simplicity it has been contemplated that all of the resource sets have native size that are a multiple of the alignment requirement, although such is not limiting. Additional bits can be added as desired to bring the size up to a multiple of the alignment requirement.

Figure 7:
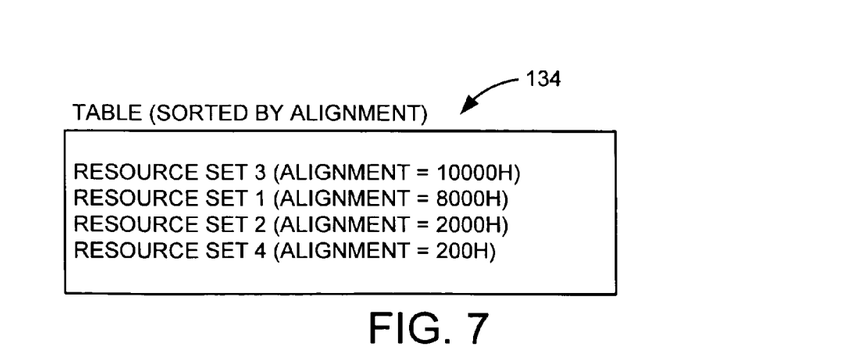
FIG. 7 shows the table of FIG. 6 after a sorting operation has been performed to sort the associated resource sets by alignment requirement.

Once the alignment requirements of the respective resource sets are determined, the table 134 is sorted by the control block 132 as shown in FIG. 7, preferably from greatest in alignment requirement to least in alignment requirement. Should two (or more) resource sets be found to have the same alignment requirement, these resource sets are grouped together and placed sequentially below resources of greater alignment requirement and above resources of lesser alignment requirement in the sequence.

Figure 8:
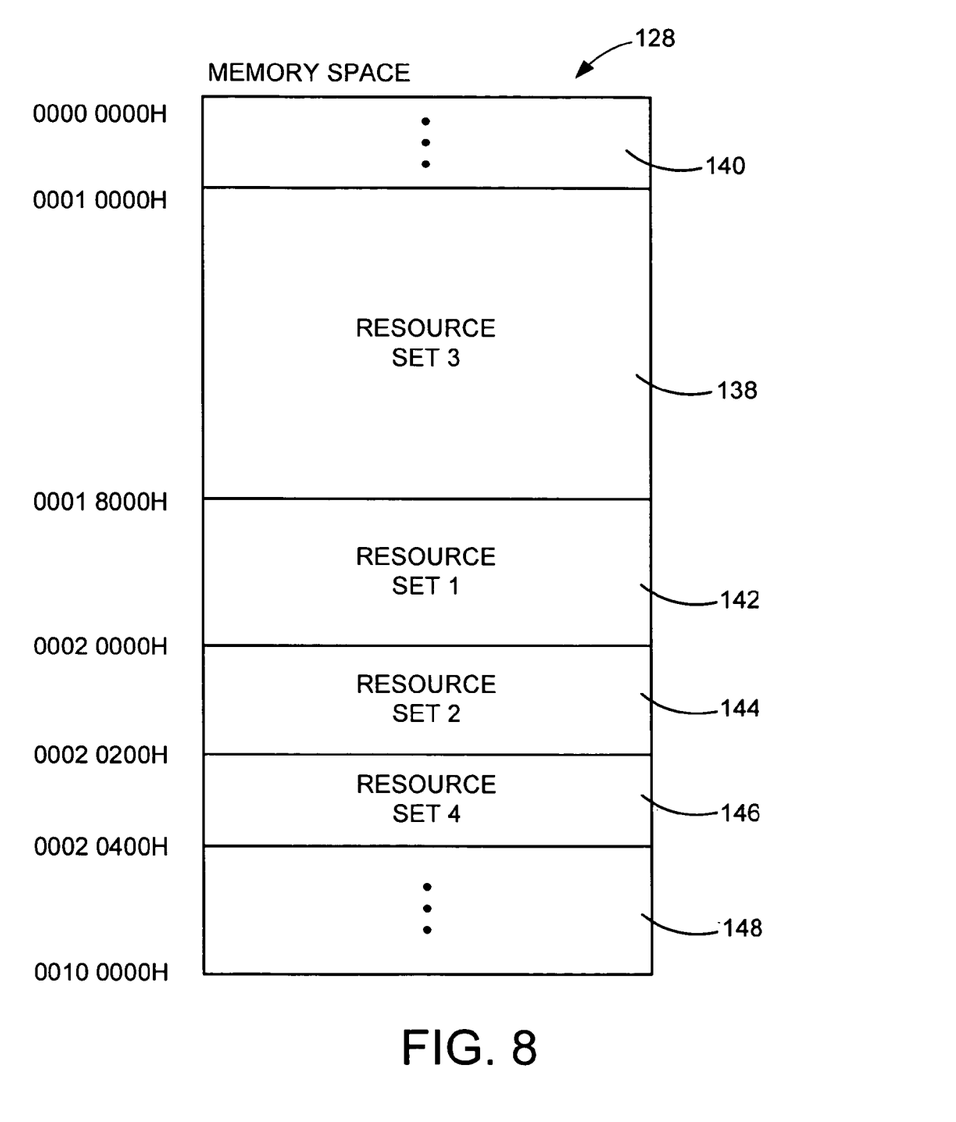
FIG. 8 illustrates the memory space with the resource sets from the sorted table allocated in order of alignment requirement, with associated aligned addresses within the memory space.
Figure 9:
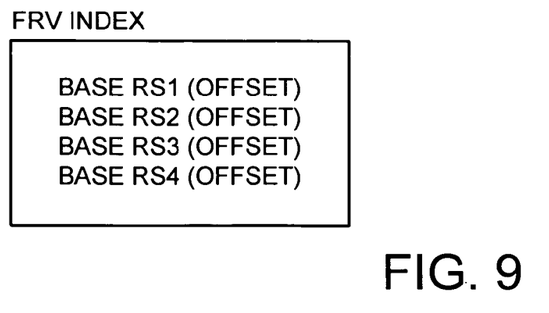
FIG. 9 illustrates the frequently referenced values (FRV) index of FIG. 5 with offsets determined from the allocations of FIG. 8.

The control block 132 next preferably operates to allocate the respective ranges of the memory space 128 for each of the sets using the sequence in the sorted table 134 (FIG. 7). As shown in FIG. 8, it is contemplated that the applicable area of the memory space 128 begins at a lower address 0000 0000H and extends to some upper value (such as 0010 0000H, etc.). It will be noted that these address ranges have been arbitrarily selected for the current example and could take any number of values as desired. Also, FIG. 8 is not necessarily represented to scale.

The resource set with the largest alignment requirement (in this case Resource Set 3) is placed in the memory space 128 first and aligned with the first memory address (base address) that corresponds to a multiple of the resource set alignment requirement. Thus, Resource Set 3 is located in an area 138 with addresses that range from 0001 0000H to 0001 7FFFH. The immediately preceding area below 0001 0000H (denoted at 140) is unused at least for these allocations. This address alignment allows the various resources in the resource set to be easily identified and retrieved from the memory space 128 through a simple address conversion operation.

The control block 132 preferably obtains and directly loads the Resource Set 3 into the area 138, but can alternatively operate to notify the appropriate module in the associated layer with the assigned location for the set, in which case the other module physically loads the set into the memory space 128 at the assigned location.

The control block 132 proceeds to select the resource set with the next largest alignment from the table 134, which in this example is Resource Set 1. This set is accordingly placed in the memory space at area 142 beginning at address 0001 8000H, which is a multiple of the resource set alignment size. In similar fashion, Resource Set 2 is placed in the memory space 128 at area 144 beginning at address 0002 0000H and Resource Set 4 is placed in the memory space 128 at area 146 beginning at address 0002 0200H. For reference, remaining, unallocated space is denoted at 148.

It will be noted that because each of the alignment requirement of the respective resource sets are a power of two, the respective sets can be easily and efficiently packed into a relatively small area of the memory space (i.e., 138-146).

For example, aligning a resource set to a given requirement allows the use of an index to identify a particular resource within a resource set. The index is multiplied by the individual resource size and then added to the resource set base. If the individual resource size is a power of two, this multiplication can be done very simply by shifting the index left by the power of two size. This results in the actual address of the resource. Since storing the resource index requires less memory than storing the resource address (i.e. 2 bytes as opposed to 4 bytes), there is significant memory usage saving.

Figure 10:
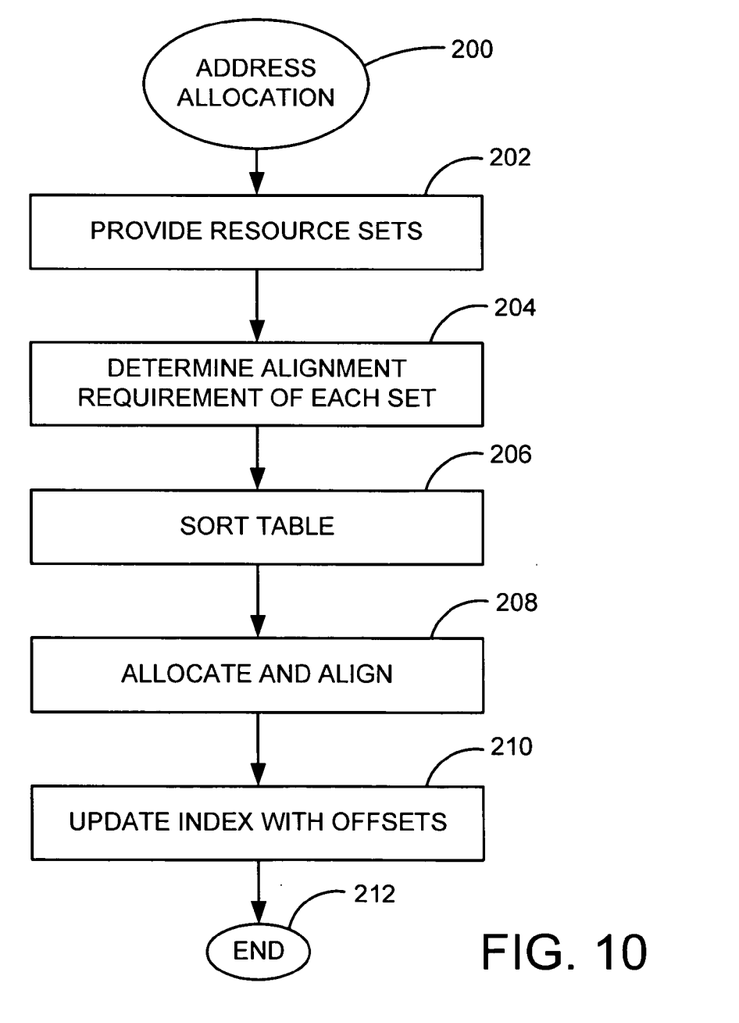
FIG. 10 is a flow chart for an ADDRESS ALLOCATION routine carried out in accordance with preferred embodiments of the present invention.

FIG. 10 provides a flow chart for an ADDRESS ALLOCATION routine 200 to summarize preferred steps carried out by the module 130 of FIG. 5. Preferably, the routine 200 is carried out each time the system is initialized, although such is not limiting.

At step 202, a plurality of the resource sets are provided, with the resource sets configured for use by a plurality of the software layers of the software system. The resource sets are preferably identified by corresponding entries in the table 134.

The size of each resource set is next determined at step 204. This step is preferably carried out as discussed above and can include the padding of additional zeros to bring the respective resource set size up to a multiple of the alignment requirement.

The table 134 is next sorted at step 206. Preferably, this results in the entries being arranged in descending order beginning with the resource set having the greatest alignment requirement and ending with the resource set having the smallest alignment requirement.

At step 208, the resource sets are placed in the memory space 128 in relation to the sequence reflected by the sorted table 134. In this way, the resource sets are sequentially aligned with the addresses in the memory space by descending alignment requirement, with each base address of the stored resources being a multiple of the respective resource set.

The resultant resource set base address is then stored in the FRV global structure. The FRV offset 136 is used at step 210 to place the base address correctly within the FRV global structure, after which the routine ends at step 212.

As mentioned previously, the table 134 includes entries for each of the resource sets utilized by the various layers that access the memory space 128. It is contemplated that any previously performed upgrades or modifications to the system software since the last system initialization will result in the table 134 being appended or otherwise modified to reflect additional entries for any new resource sets or to reflect changes in the alignment requirement of existing sets.

Thus, the table 134 preferably reflects those resource sets that require address allocation beginning at the next system initialization. This permits the module 130 to adaptively modify the address allocations in the memory space 128 each time the routine 200 is executed.

By way of example, should a new resource set be added with an alignment requirement that is larger than the aforementioned Resource Set 3, this new resource will be bumped up in the memory space 128 and Resource Set 3 will be moved down accordingly during the next allocation operation.

Such a change in address allocation for the various resource sets will generally be transparent to the various other processes in the system. This is because the various processes will use the base address within the FRV global structure, unaffected by the fact that the base address changed. Accordingly, the module 130 accommodates substantial modifications to the resource sets and reduces the need to make corresponding changes to various other processes that utilize the resource sets during operation.

It will now be appreciated that preferred embodiments of the present invention are generally directed to a method and apparatus for aligning addresses of resource sets in a memory space (such as 128) used by a software system, such as in a distributed computer-based system (such as 100) that utilizes a data storage array (such as 104).

In accordance with some preferred embodiments, the method preferably comprises providing a plurality of resource sets configured for use by a plurality of software layers in a software system with each resource set having an associated size (such as by step 202). The method further preferably comprises aligning base addresses in a memory space with said resource sets arranged by descending alignment requirement (such as by step 208).

The method further preferably comprises employing a table (such as 134) with a plurality of entries each corresponding to a selected one of the plurality of resource sets, and sorting said entries to provide a decreasing sequence beginning with the resource set having the greatest alignment requirement and ending with the resource set having the smallest alignment requirement (such as by step 206).

Preferably, each of the associated sizes of the resource sets comprises a multiple of the alignment requirement. When a selected resource set has an associated initial size that is not a power of two, the method further preferably comprises a step of appending bits to the selected resource set to provide a final size equal to a multiple of the alignment requirement (such as by step 204).

The method further preferably comprises identifying a base address for each of a number of resources provided in each resource set in relation to the associated alignment requirement of said resource set, and determining an actual address for each said resource within the memory space. This base address is then stored at the given offset (such as 136) within a global structure.

In accordance with further preferred embodiments, the apparatus preferably comprises a software system resident in a first memory space and comprising multiple layers each configured to access at least one respective resource set having an associated alignment requirement, the software system further comprising an address alignment module (such as 130) which sequentially aligns address ranges in a second memory space (such as 128) with said resource sets arranged by descending alignment requirement.

The module preferably comprises a table (such as 134) with a plurality of entries each corresponding to a selected one of the resource sets. A control block preferably sorts the entries in the table to provide a decreasing sequence beginning with the resource set having the greatest alignment requirement and ending with the resource set having the smallest alignment requirement, with the control block aligning the address ranges of the second memory space in relation to the decreasing sequence.

A global structure (such as 136) preferably stores the base address for a selected resource, which is the actual address for said resource within the second memory space.

For purposes of the appended claims, the recited first means will be understood to correspond to the disclosed module 130 of FIG. 4. Because the module 130 provides globalized address alignment for resource sets from different software layers, systems that permit the individual layers to individually allocate memory locations do not perform the recited function and are expressly excluded from the definition of an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. A method comprising steps of:
providing a plurality of resource sets configured for use by a plurality of software layers in a software system with each resource set having an associated alignment requirement, wherein bits are appended to at least one of the resource sets to increase the overall size of the resource set to be equal to the associated alignment requirement of the resource set;
sorting the resource sets in an order from a largest alignment requirement to a smallest alignment requirement by sorting entries in a table with each entry corresponding to an associated resource set;
aligning the sorted resource sets with base addresses in a memory space in said order with each base address comprising a multiple of the alignment requirement of the associated resource set;
subsequently retrieving a selected resource set from the memory space by multiplying an index value associated with the selected resource set by an overall size of the selected resource set to provide a product value, and by adding the product value to the base address of the resource set having the largest alignment requirement to identify the base address of the selected resource set;
updating the table to add an entry corresponding to a new resource set;
re-sorting the entries in the table to provide a new order for the resource sets from said largest alignment requirement to the smallest alignment requirement; and
re-aligning the sorted resource sets in the memory space in the new order.

2. The method of claim 1, wherein each resource set has an overall size equal to the alignment requirement of said resource set.

3. The method of claim 1, wherein each of the associated alignment requirements of the resource sets comprises a power of two.

4. The method of claim 1, wherein the subsequently retrieving a selected resource set further comprises accessing the identified base address of the memory space to recover a copy of the selected resource set.

5. The method of claim 1, wherein the providing, sorting and aligning steps are carried out during a first initialization of a system that utilizes said plurality of software layers.

6. The method of claim 5, wherein during system operation the new resource set is added to the plurality of resource sets, and the re-sorting and the re-aligning steps are carried out during a second initialization of the system resulting in a different base address for at least one of said resource sets stored in the memory space during said first initialization.

7. An apparatus comprising a software system comprising at least one programmable processor and corresponding software resident in a first memory space, the software system comprising multiple layers configured to access a plurality of resource sets each having an associated alignment requirement, the software system further comprising an address alignment module which sorts entries in a table corresponding to said plurality of resource sets in an order from largest alignment requirement to smallest alignment requirement and aligns the resource sets with respective base addresses in a second memory space in said order to provide a contiguous storage area in said second memory space occupied by said resource sets, each base address in the storage area comprising a multiple of the alignment requirement of the associated resource set, wherein at least one deficient resource set has a size that is not a multiple of the associated alignment requirement and one or more bits are appended to the deficient resource set so that the size becomes a multiple of the associated alignment requirement, and wherein two or more of the multiple layers access a selected one of the aligned resource sets, wherein the table is updated to identify a new resource set, and wherein the alignment module is further configured to re-sort the entries in the table with the new resource set and provide a new alignment of the resource sets in the second memory space in relation to said re-sorted table.

8. The apparatus of claim 7, wherein each resource set has an overall size that is equal to its associated alignment requirement after the appending of one or more bits to the deficient resource set.

9. The apparatus of claim 7, wherein the address alignment module sorts the entries in the table to provide a decreasing sequence beginning with the resource set having the greatest alignment requirement and ending with the resource set having the smallest alignment requirement, and aligns the address ranges of the second memory space in relation to said decreasing sequence.

10. The apparatus of claim 7, wherein each of the associated alignment requirements of the resource sets comprises a power of two.

11. The apparatus of claim 7, wherein a selected resource set has an associated initial alignment requirement that is not a power of two, and wherein the address alignment module operates to append bits to provide a total alignment requirement equal to a power of two.

12. The apparatus of claim 7, wherein the address alignment module further operates responsive to a request by a selected software layer for a selected resource set to identify a base address for the selected resource set in relation to the associated alignment requirement of said selected resource set, the base address of the largest resource set and an index value.

13. The apparatus of claim 12, wherein an index value as a unique offset is stored in a memory for each of the resource sets in turn.

14. The apparatus of claim 7, characterized as a computer-based system comprising a data storage array.

15. The method of claim 1, wherein each resource set has a different native size, base address, and alignment requirement.

16. The method of claim 1, wherein a first number of bits are appended to a first resource set and a second different number of bits are appended to a second resource set to make the first and second resource sets each multiples of different alignment requirements.

17. A system comprising a host device, a storage device adapted to store data supplied by the host and a controller operationally coupled between the host device and the storage device, the host device, controller and storage device each comprising a respective local memory which stores at least one software layer of a hierarchical software structure, the controller further comprising an address allocation module which sorts a plurality of different sized resource sets utilized by said software layers in an order from largest to smallest alignment requirement, stores said sorted resource sets in a program area of the local memory of the controller in said order by aligning said resource sets with base addresses of the program area, and stores a different index value for each of the stored sorted resource sets in said controller local memory, wherein responsive to a subsequent read request for a selected resource set from a selected software layer, the address allocation module derives the base address of the selected resource set by multiplying the index value associated with the selected resource set by an overall size of the selected resource set to provide a product value, and by adding the product value to the base address of the resource set having the largest alignment requirement to identify the base address of the selected resource set, wherein bits are appended to at least one of the resource sets to increase the overall size of the resource set to be equal to the associated alignment requirement of the resource set, wherein the address allocation module sorts the plurality of different sized resource sets by sorting entries in a table with each entry corresponding to a selected one of said plurality of resource sets, wherein the table is updated to identify a new resource set, and wherein the address allocation module is further configured to re-sort the entries in the table with the new resource set and provide a new alignment of the resource sets in the second memory space in relation to said re-sorted table.

18. The system of claim 17, in which the controller further uses the identified base address to access the memory and retrieve a copy of the selected resource set to the selected software layer.

* * * * *